(12) United States Patent
Mehta et al.

(10) Patent No.: US 8,719,129 B2
(45) Date of Patent: May 6, 2014

(54) MONEY SERVICES SYSTEM

(75) Inventors: Dharmesh Mehta, Annandale, VA (US); Prashant Rami, Gainesville, VA (US)

(73) Assignee: Dharmesh Mehta, Annandale, VA (US)

( * ) Notice: Subject to any disclaimer, the term of this patent is extended or adjusted under 35 U.S.C. 154(b) by 898 days.

(21) Appl. No.: 12/264,079

(22) Filed: Nov. 3, 2008

(65) Prior Publication Data
US 2009/0177570 A1 Jul. 9, 2009

Related U.S. Application Data

(60) Provisional application No. 60/984,577, filed on Nov. 1, 2007.

(51) Int. Cl.
*G06Q 40/00* (2012.01)
(52) U.S. Cl.
USPC .................. 705/35; 705/42; 705/43; 705/44; 705/45

(58) Field of Classification Search
USPC .............................................. 705/35, 38–40
See application file for complete search history.

(56) References Cited

U.S. PATENT DOCUMENTS

| 8,336,088 B2 * | 12/2012 | Raj et al. ........................... 726/6 |
| 2005/0125337 A1 * | 6/2005 | Tidwell et al. .................. 705/39 |
| 2006/0212391 A1 * | 9/2006 | Norman et al. ................. 705/40 |

* cited by examiner

Primary Examiner — Rajesh Khattar
(74) Attorney, Agent, or Firm — Mannava & Kang, P.C.; Ashok K. Mannava

(57) ABSTRACT

A check cashing system is configured to scan in a check to be cashed and scan a customer ID of a customer cashing the check. Information for the customer, including check cashing history, information for the maker of the check and other information is displayed to verify the authenticity of the check. Also, warnings are displayed if the check is considered fraudulent based on whether criteria are met.

19 Claims, 19 Drawing Sheets

Employee: PRASHANT RAMI
Drawer: VAULT
Friday, 31 October 2008

CHECKS CASHED

16:14

| Qty | Desc | Price | Fees | Disc | Amt |
|-----|------|-------|------|------|-----|
|     |      |       |      |      |     |
|     |      |       |      |      |     |
|     |      |       |      |      |     |
|     |      |       |      |      |     |

< = >

Delete Items | Sales Tax Option

Tax Exempt | Delete All

Taxable Subtotal $
Non-Taxable Subtotal $
Sales Tax $
Sales Tax $

A

| APS CON | APS DOM | CONVPAY | GLOBAL |
| MO25 | QUICKPAY | VERIZON | WU |
|  |  |  |  |
|  |  |  |  |

Previous    Next

B

| Check Cashing | Quick Cashing | Receive Cash | Finish |
| Multiple Check | Lookup | Cash Transfer |  |
| Global Express | CTR/SAR | Other | Quit |

C

CUSTOMER PROFILE

800

Customer # : 319
Name :
Address :
City :
State :
Driver License:
SSN # :
Phone :

1.5%

PICTURE OF CUSTOMER

PICTURE OF CUSTOMER ID

| # | CHKNG | DATE | MAKER | AMOUNT | FEES |
|---|---|---|---|---|---|
| 1 | 21017 | 06/28/07 | | $9,500.00 | $143.00 |
| 2 | 21016 | 06/21/07 | | $6,110.00 | $92.00 |
| 3 | 0726 | 06/21/07 | | $2,300.00 | $35.00 |
| 4 | 8815 | 05/01/07 | | $4,000.00 | $60.00 |
| 5 | 0104 | 04/19/07 | | $8,995.00 | $135.00 |
| 6 | 0103 | 04/11/07 | | $2,500.00 | $38.00 |
| 7 | 0102 | 03/30/07 | | $7,100.00 | $107.00 |
| 8 | 0101 | 03/16/07 | | $7,100.00 | $87.00 |
| 9 | 1171 | 03/16/07 | | $6,000.00 | $90.00 |

Total Checks: 67
Total Amount: $265,544.01
Total Bad Checks: 0
Due Amount: $0.00

Print Check Details
Mark As Bad Check
Mark As Recovered
RDI Notice
Collection Agency
Network Upload Scan ID | Customer Picture | Capture Finger Print | Back | Next | Finish

Confirm Fees

WARNING
CHECKS CASHED LAST 3 DAYS

Cust Name :
Chk Count # 1    Amount: $100.00
Maker Name:
Chk Count # 1    Amount: $100.00

Customer Name:
Ask Following Questions
1. Move to New Location?
2. Normal Visit?
3. Working On this Location
Take Home Phone & Work Phone
If moved take complete Address of
Verify with Maker Check Amount: 100
Check Fees: 2%

| 7 | 8 | 9 | Clear Entry | 2 |
| 4 | 5 | 6 | Fees % | |
| 1 | 2 | 3 | Fees $ | |
| | 0 | | | |

| 1.25% | 1.50% | 1.75% |
| 2.00% | 3.00% | 6.00% |

Admin Fees
$0.00
Check Cashing Fees
$2.00
Final Fees
$2.00

Final Amount
$98.00

Back    Next    Finish

FIG. 9

MONEY SERVICES SYSTEM

CLAIM FOR PRIORITY

The present application claims the benefit of priority to U.S. Provisional Patent Application Serial No. 60/984,577, filed on Nov. 1, 2007, entitled "Money Services Business", by Dharmesh Mehta, the disclosure of which is hereby incorporated by reference in its entirety.

BACKGROUND

The check cashing industry has grown considerably over the years. In addition to check cashing, other services are typically provided, such as money orders, wire transfers, etc.

Unfortunately, with the increase of check cashing services, fraud and other crimes have grown considerably. For example, situations may arise where an individual makes several copies of a check and attempts to cash the copies at several check cashing locations in a single day. In other situations, an individual may attempt to cash another person's check by representing his/her self as that other person.

Many check cashing services may have the ability to verify account information before cashing a check. However, other than relying on prior relationships with individuals that cash checks periodically, such as pay checks every two weeks, etc., or hand-written notes, these check cashing services typically lack sophisticated technology to prevent fraud, resulting in lost money and wasted time and resources.

Furthermore, many check cashing operations tend to rely on manual methods for performing many tasks associated with check cashing and other money processing services. These methods are highly susceptible to error, and may result in lost money or fines for lack of compliance with government regulations.

SUMMARY

According to embodiments, a system and software are provided for providing money services. The software is operable to provide check cashing services, compliance reporting, bill payment services, non-bill payment services, inventory control, money order and WESTERN UNION services, point-of-sale (POS), payday loan processing and other services described in detail below. The software also makes warnings and compliance decisions and provides automated warnings and alerts when necessary.

BRIEF DESCRIPTION OF THE DRAWINGS

Embodiments are illustrated by way of example and not limited in the following Figure(s), in which like numerals indicate like elements, in which:

FIGS. 7-9 illustrate exemplar screen shots, according to embodiments.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Figure 1:
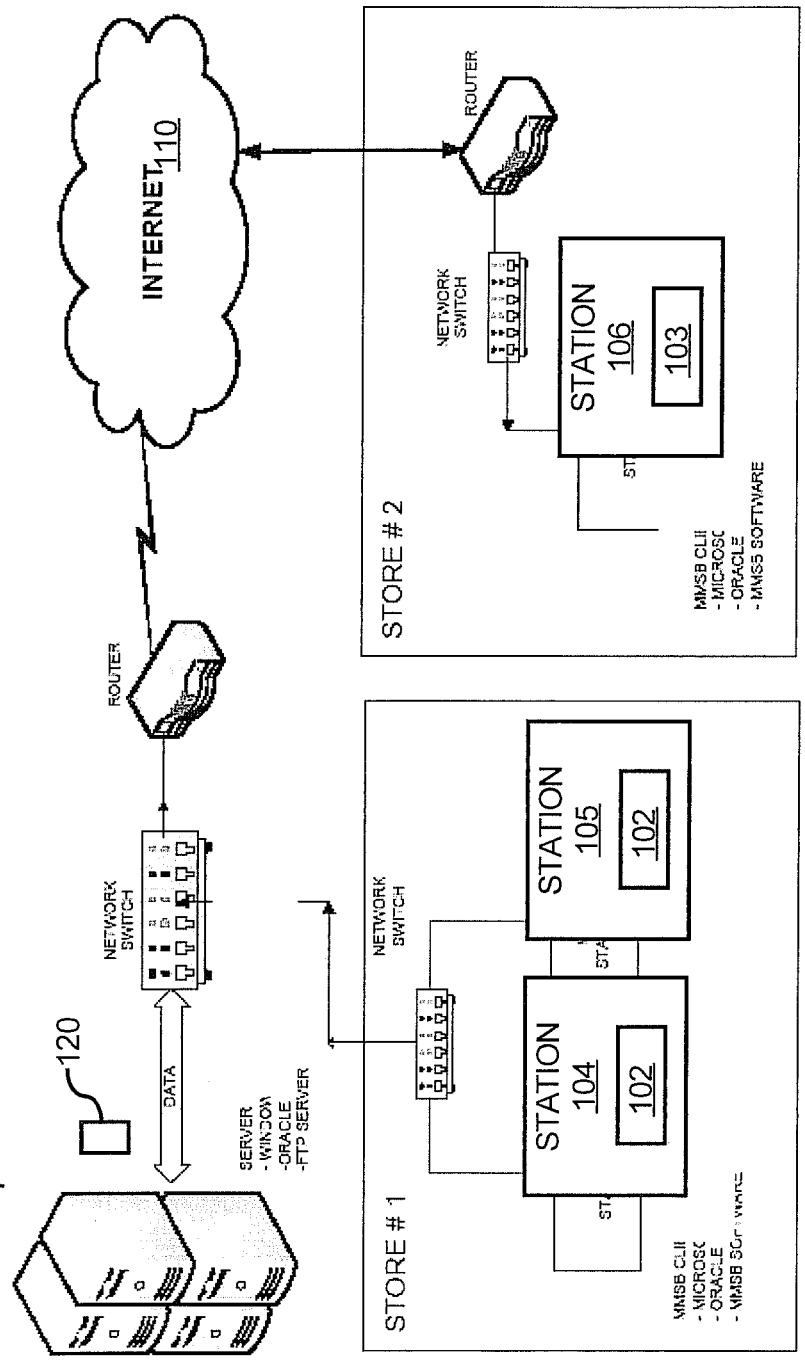
FIG. 1 illustrates a system that is operable to provide money services, according to an embodiment.

FIG. 1 illustrates a system 100 that provide money services, according to an embodiment. The system 100 illustrates a client-server architecture by way of example and not limitation. For example, software 120 providing the money services may be stored and executed on a server 101. Software clients 102 and 103 may run on computers at stores 1 and 2 respectively. One or more stations 104-16 running the client software 102 and 103 may be provided at each store and communicate over a network, such as the Internet 110, with the software on the server 101. Network switches and routers are shown and may be used to connect devices with other devices via a network, as is known in the art. In this embodiment, multiple stores may quickly and easily share data about check cashing and other services, which may prevent fraudulent transactions. In another embodiment, the money services software may run on a standalone computer system in a store or in a network local to a store.

Figure 2:
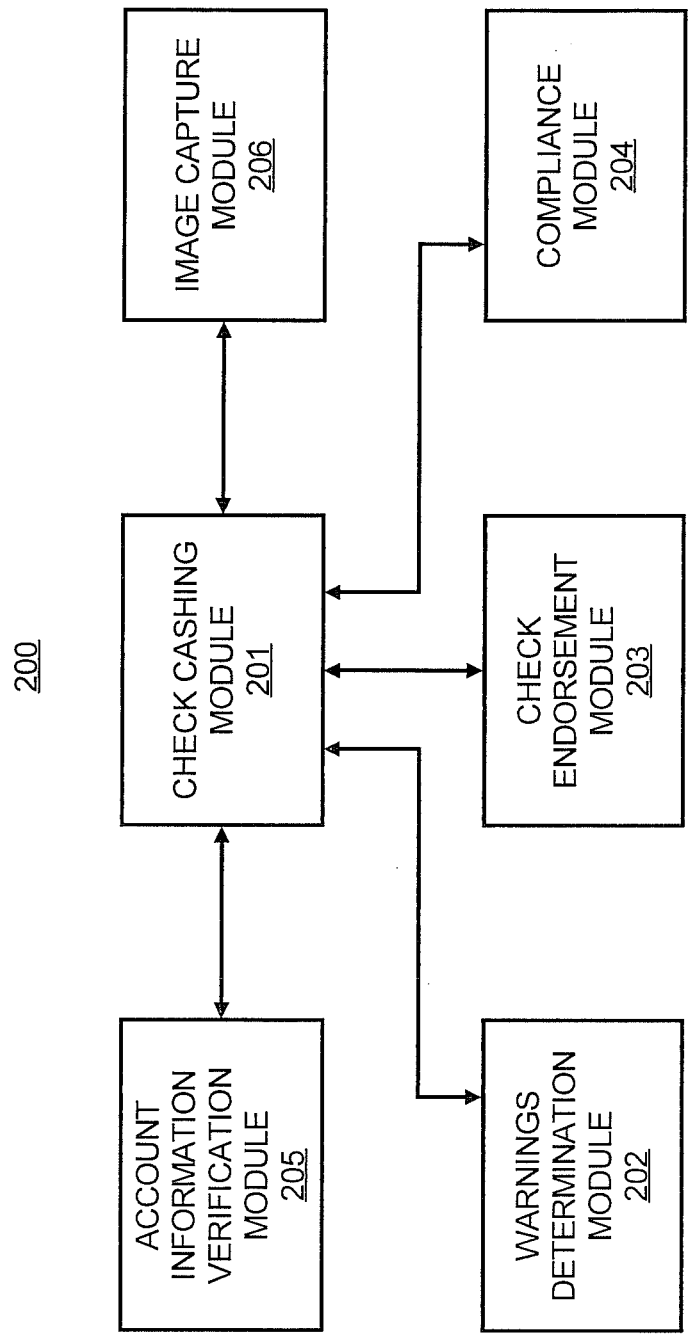
FIG. 2 illustrates a software architecture of the money services, according to an embodiment.

FIG. 2 illustrates a software architecture 200 for the check cashing services and other services, according to an embodiment. The software architecture 200 may include a check cashing module 201, warnings determination module 202, check endorsement module 203, compliance module 204, account information verification module 205, and image capture module 206.

Figure 3A:
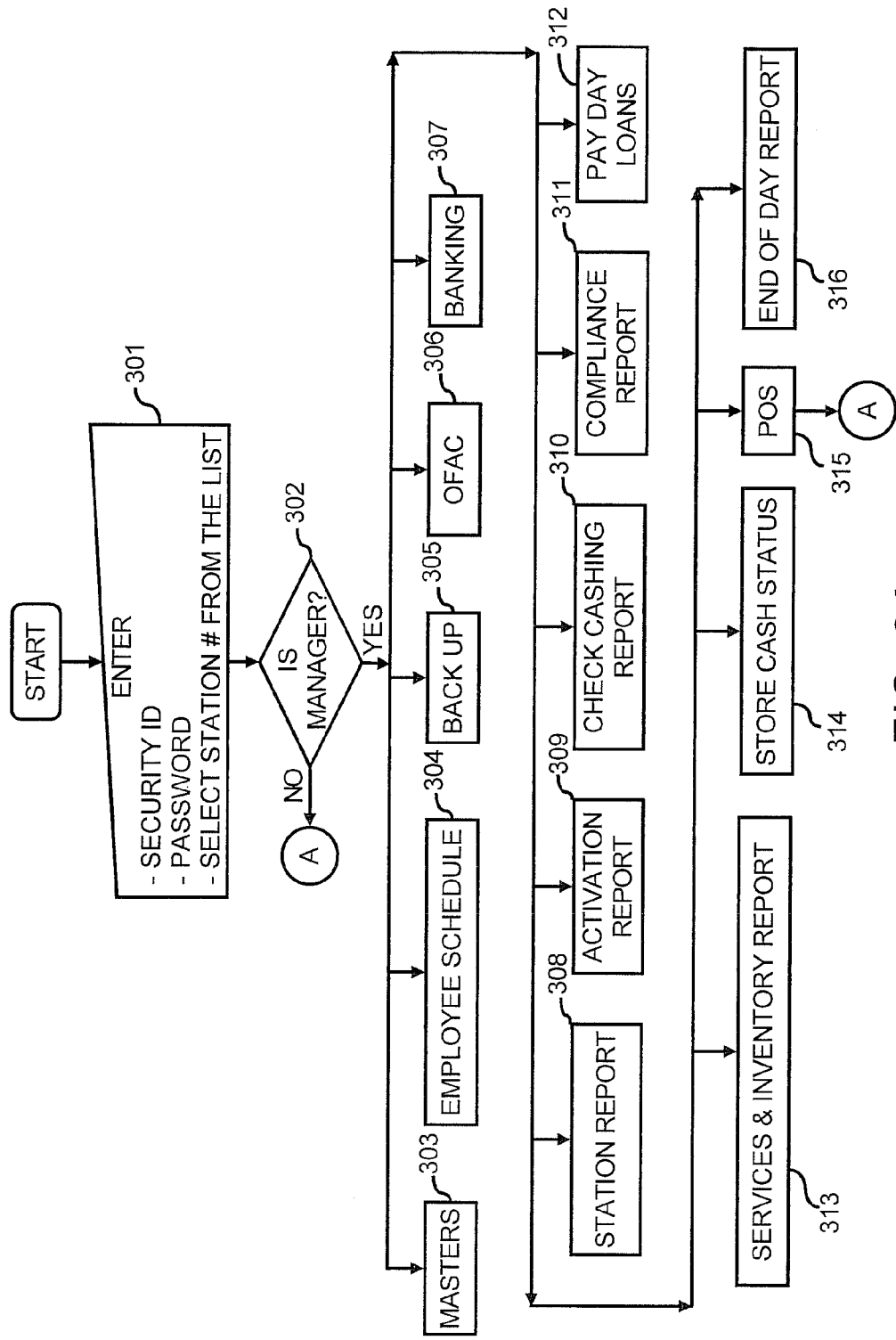
FIGS. 3A-B illustrate data flow diagrams for money services provided by the system and software, according to an embodiment.
Figure 3B:
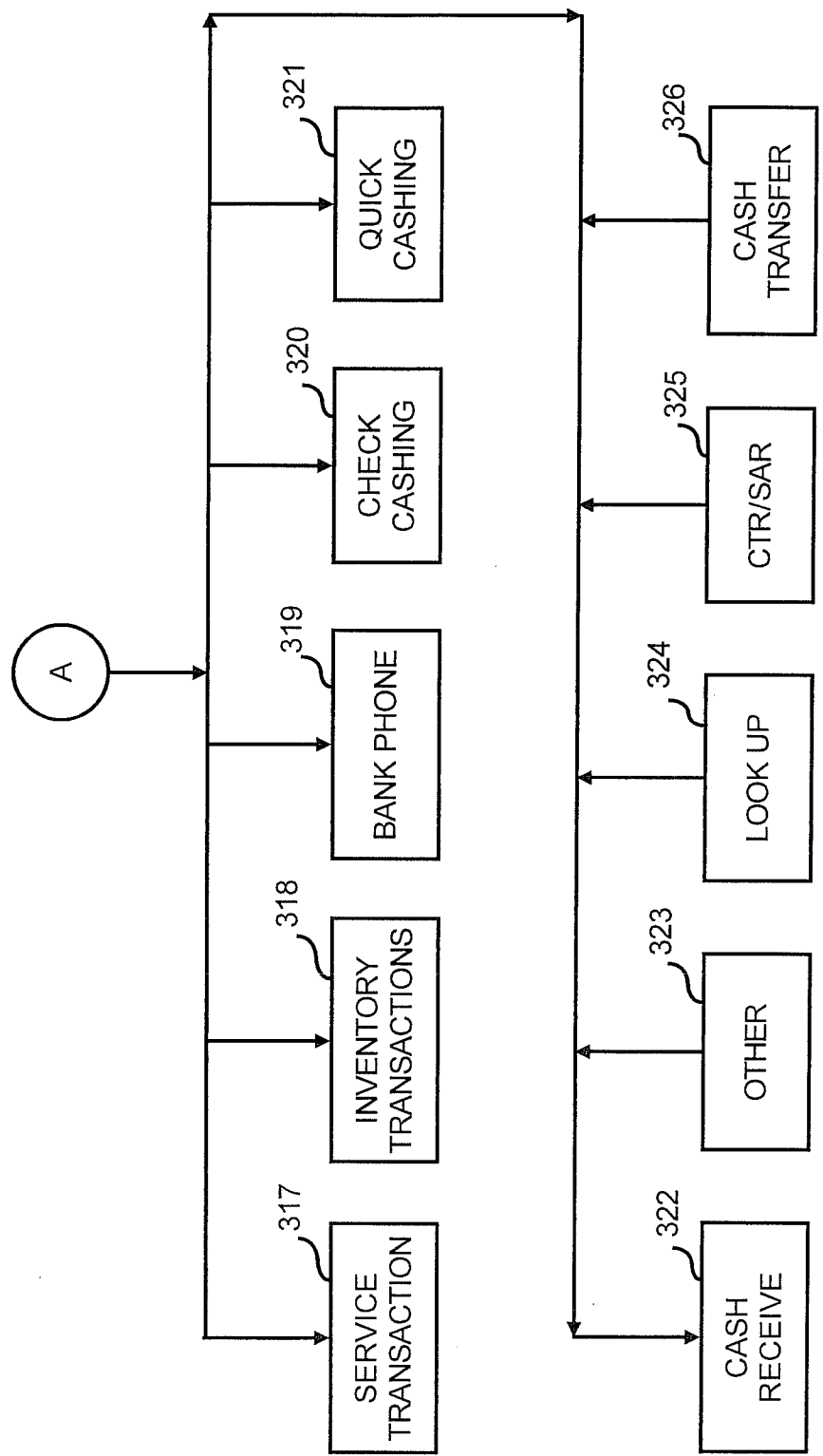
Figure 4A:
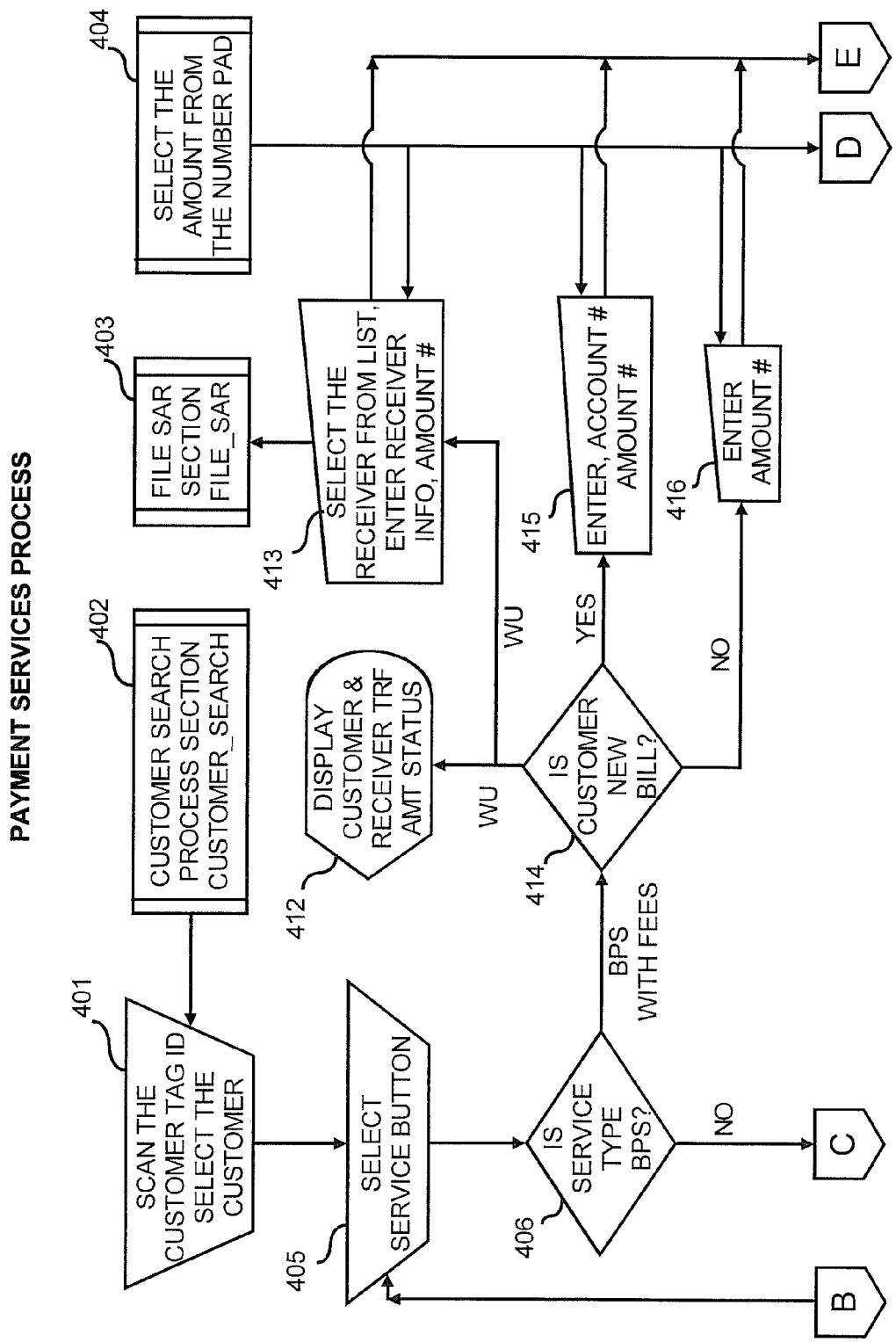
FIGS. 4A-B illustrate flow charts of a method for payment services processing, according to an embodiment.
Figure 4A:
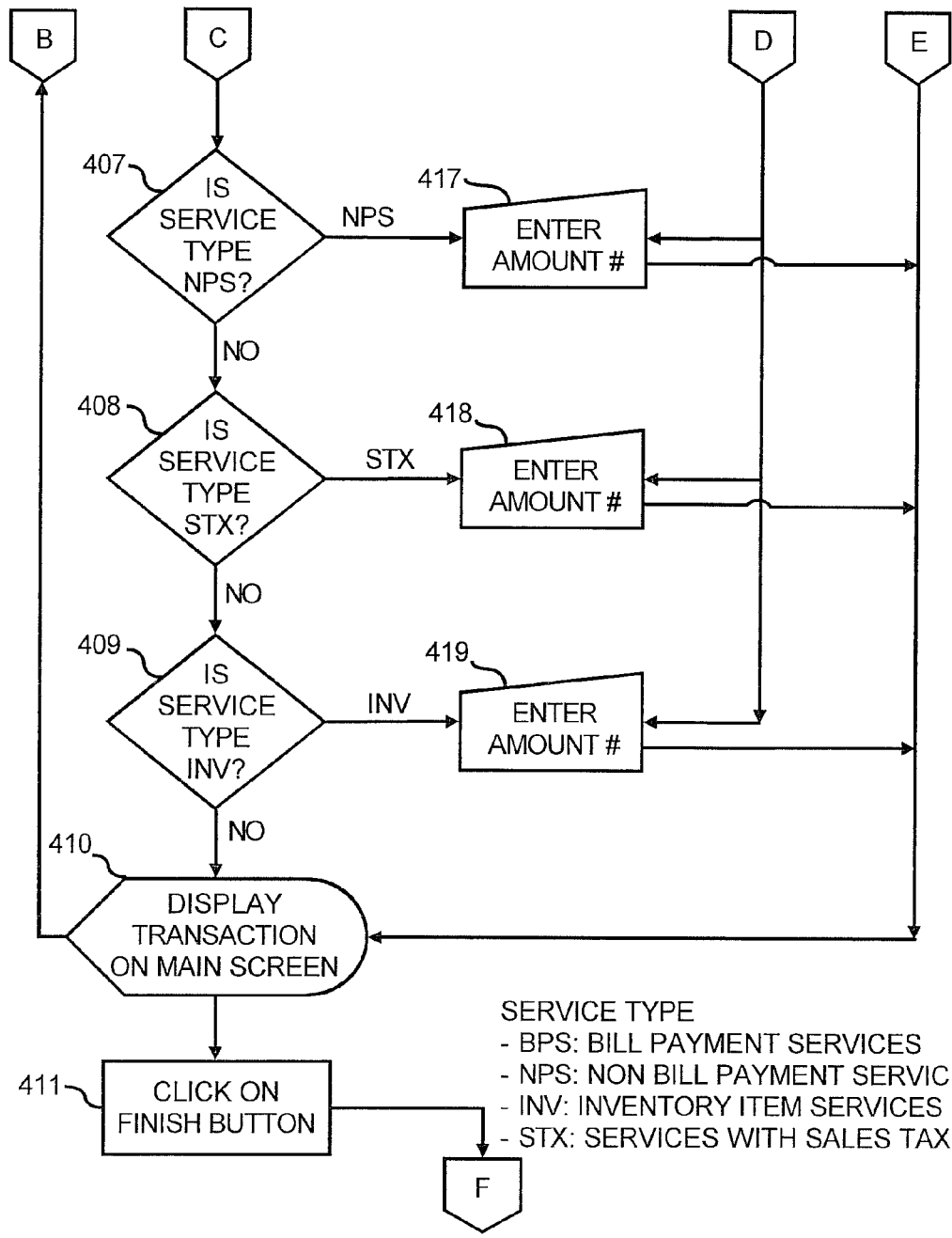

The check cashing module 201 performs processes for cashing checks, such as described in the flow charts shown in FIGS. 3 and 4. The image capture module 206 may capture and store images of individuals and also capture images of checks. Optical character recognition may be used to read information from the checks, and bar code readers may additionally be used to read information from checks.

The warnings determination module 202 uses information from checks, information stored in a database about individuals and their accounts and other information, all of which may be stored in one or more of servers 101, to determine whether a transaction may be fraudulent and provide alerts and warnings accordingly. The check endorsement module 203 automatically prints information on checks being cashed. The compliance module 204 automatically generates reports and files reports with government agencies. The account verification module 205 verifies account information electronically with banks before checks are cashed.

The software architecture 200 may include other modules not shown and may provide other functions. A list of some of the functions performed by the money services software and system running the software is as follows: verifies social security number and the identity of the person with OFAC List (OFAC stands for the Office of Foreign Assets Control of the U.S. Department of the Treasury and it administers and enforces economic and trade sanctions against targeted foreign countries, terrorism sponsoring organizations and international narcotics traffickers based on U.S. foreign policy and national security goals); system endorsement on checks (e.g., name of the company, company account information, teller ID, date and time check was cashed and the station number are endorsed along with the customer's name); verifies date on the check (e.g., ensures that the date the check was written is not more than 30 days old or some other predetermined period of time); and alerts and bold lettered warnings. Alerts (e.g., audio and/or visual) and bold lettered warnings are provided when someone cashes more than one check in a span of few days or some other predetermined time period; if there are fraudulent or bad checks; if the customer has a bad history and the instrument needs to be verified. Other modules and functions include auto-generated and electronic filing of Currency Transaction Report (CTR) and Suspicious Activity Report (SAR) as per the requirements. The system generates the CTR and SAR whenever it detects that a transaction over $10000 has been done or there is a suspicious transaction. The system provides strong compliance to the requirements of the Patriot Act. The system has capability to capture the image of the person cashing the check, sending WESTERN UNION, buying money orders, etc. Also, signatures of the customers are also captured and stored in the database. A main screen generated by the software has a ticker which has important messages warning and educates all the tellers about various new additions to the rules and criminal activity. The software verifies the bank and account information of the check that has been presented at the click of a button. The database is accessible from all store locations if everything is networked. This reduces the chances of multiple fraudulent activities. The system recognizes only genuine state-issued ID's and drivers licenses of all the 50 states. Money Order and WESTERN UNION logs are generated automatically to comply with the Patriot Act. The system caters to a wide array of activities—Payday Loans, Inventory Management, Employee Scheduling and staffing and QUICK BOOK Integration. Also, OFAC Verification is a real time activity and complies with the Patriot Act.

FIGS. 3A-B illustrate a data flow diagram of the money services system and software. The software is operable to provide service transactions, inventory transactions, bank phone, check cashing, quick cashing, cash receive, other, lookup, CTR/SAR compliance, cash transfer and other functions.

As shown in FIG. 3A, at 301, a user logs in and the system determines whether the user is a manager at 302. The system stores IDs with designations of whether the ID is for a manager or other type of user. If the user is a manager, the manager has options to use many functions as shown. For example, a manager in a store that logged in to the system is presented with a graphic user interface (GUI) that includes the functions shown in FIG. 3A. Masters 303 includes screen templates that a manager can use to add information into the system, such as adding new accounts, etc. The employee schedules 304 may also be stored and shown through the system.

Backup 305 includes backup of information on a storage device.

The system connects with OFAC to file reports as shown with 306. The system also provides bank verification as part of banking 307. The system connects to an ATM network to determine the status of bank accounts when check cashing. For example, the bank may mark the account with a negative status. The bank verification will notify the user the status of the account so the check cashing service will not be provided. Stop payment information may also be determined.

Banking 307 generates the reports for any payment services.

The station report 308 generates reports regarding activity at each station in the store.

Activation reports 309 is for activating cell phones. It creates a log file to send to the cell phone company to activate the cell phone.

Check cashing services and reports 310, compliance reports 311, end of day reports 316, and store cash status 314 are also generated.

Pay day loan reports 312 are generated. This keeps track of loaned amounts and payment amounts for the loans. The system may connect to a separate pay day loan system to send and receive information for generating reports and providing the services.

The system also provides inventory services and reports 313.

The system also provides a point of sale (POS) terminal 315 for selling goods and services.

As described above, in addition to providing check cashing services, the system provides many other services that may be used in a store, such as inventory control, point of sale terminals, cash transfers, service transactions (money order, WESTERN UNION, etc.), and other functions. This is shown in FIG. 3B. Note that the data flow may continue to FIG. 3B through the POS in FIG. 3A or through non-manager transactions. For example, a non-manager user at a store, which may include a teller or some other user, may be presented with the functions described below via a GUI generated by the system.

In FIG. 3B, service transactions 317 may include money order, WESTERN UNION, etc. The inventory transactions 318 are for inventory control. The bank phone 319 may simply list bank phone numbers. Check cashing 320 and other payment process services 323 are described above and with respect to the payment services process flow shown in FIGS. 4A-B. Quick cashing 321 is for companies that provide many checks for cashing, such as for payday.

Cash receive 322 and cash transfer 326 may be between registers or between stores, etc.

Other 323 may be for closing registers and checking deposits.

Lookup 324 is for customer/maker history or for check information or any other stored information.

CTR/SAR 325 is used to generate and file reports.

Figure 4B:
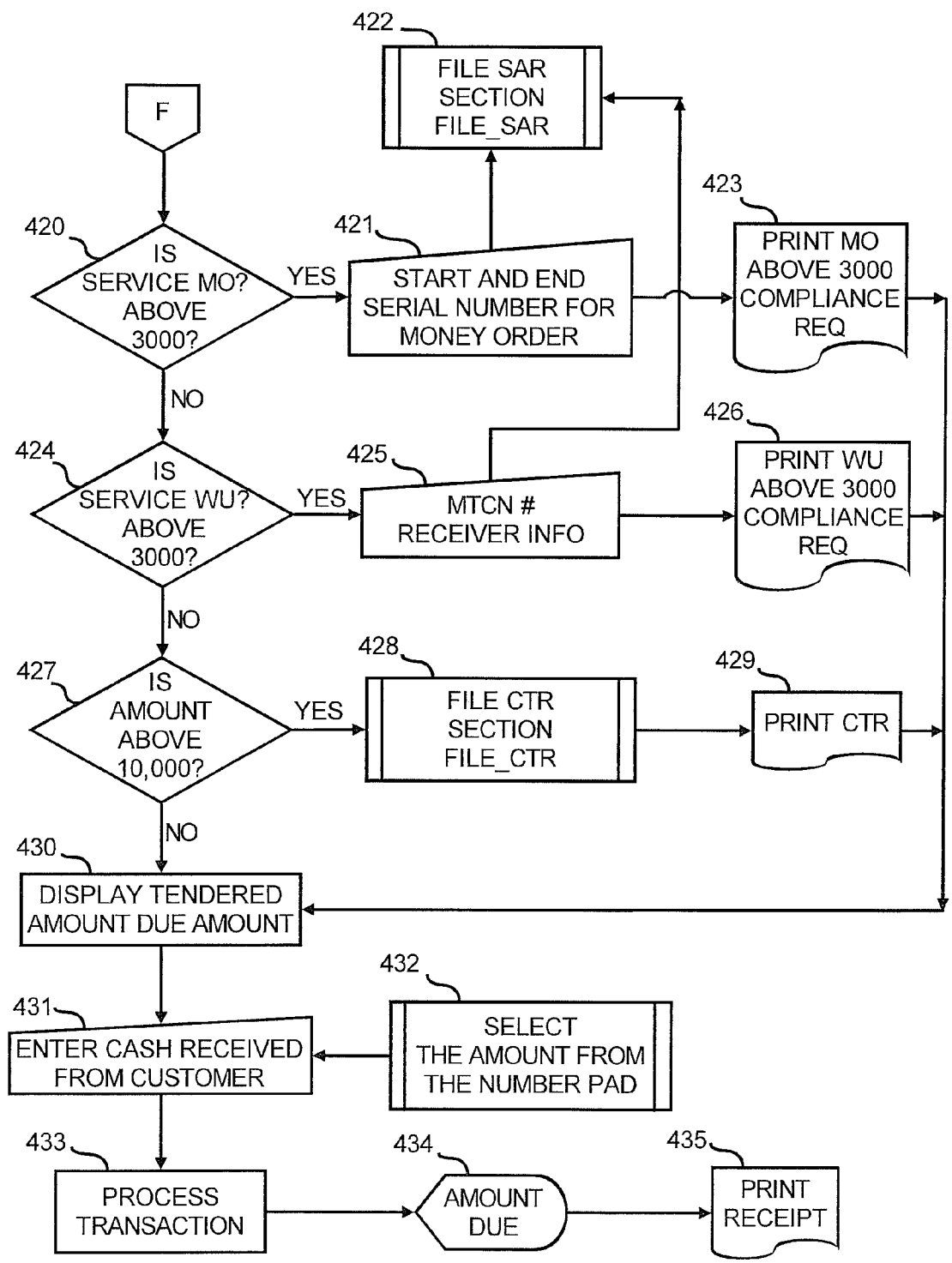

FIGS. 4A-B illustrate a payment services process. The system is operable to generate a unique customer ID and account for each customer. A tag with the ID and a photo is issued to the customer, and they may use the tag to receive payment services. For example, the tag is scanned to bring up customer information as shown as 401 in FIG. 4A. The tag may be provided on a plastic card that is given to the customer. The card may include a photograph of the customer, which is taken at the store.

The services shown in FIG. 4A include bill payment services (BPS), non-bill payment services (NPS), services with sales tax (STX) (e.g., cell phone services), and inventory items (INV). For inventory items, the user scans the UPC code to keep track of inventory.

At 401, the customer's tag is scanned to retrieve the customer information. This may be in response to entering a customer search section in the GUI at 402.

After the customer information is found, the user may select a service at 405. The services that may be selected include BPS 406, NPS 407, service with STX 408, and INV 409. If the service is BPS, then a determination is made as to whether the service is for a new BPS at 414. If the bill is new, then the bill account information and mount is entered at 415. Otherwise, just the amount is entered at 416. For WESTERN UNION (WU) service, at 412, the customer status is displayed, and at 413, the receiver is selected. At 403, the SAR is filed for the WU transaction.

For NPS or a service with STX, the amount is entered at 417 and 418, respectively. For INV, the quantity is entered at 419. Amounts and other information may be entered from a displayed number pad at 404. Also, the transaction for each service is displayed to the user at 410 and the user finishes at 411. The user may then perform another transaction.

FIG. 4B shows more steps for payment services. The steps include actions performed in response to money order and WU transfers exceeding $3000.00 at 420 and 424, respectively. For example, the system automatically generates and prints compliance reports for these transactions at 423 and 426, respectively. No other systems integrate WU services or automatically generate these compliance reports. For the money order (MO) service, serial numbers are entered at 421. For the WU service, receiver information for the receiver of the wire transfer is entered at 425, and the SAR is filed at 422.

Also, actions are performed in response to transactions over $10,000.00 at 427. The system automatically generates and files CTR reports at 428 and 429 using the customer information and transaction information entered and stored in the system. Typically, stores generate these reports manually, which is highly susceptible to error.

At 430, the tendered amount, if any, is displayed. At 431, the cash received from the customer is entered, for example, using a displayed number pad at 432. At 433-435, the transaction is processed, the amount due, if any, is paid, and the receipt is printed.

Figure 5A:
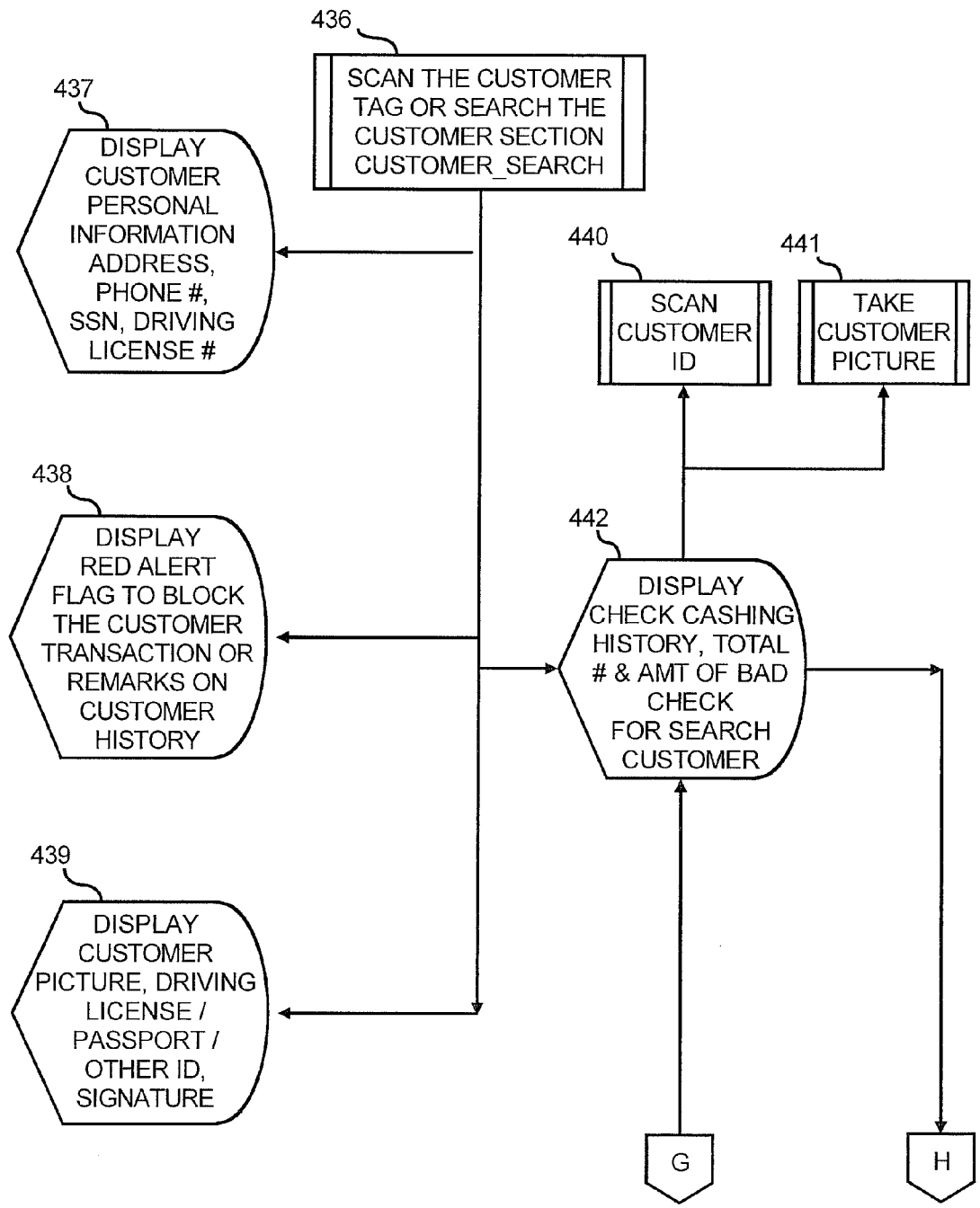
FIGS. 5A-F illustrate flow charts for check cashing processing, according to an embodiment.
Figure 5A:
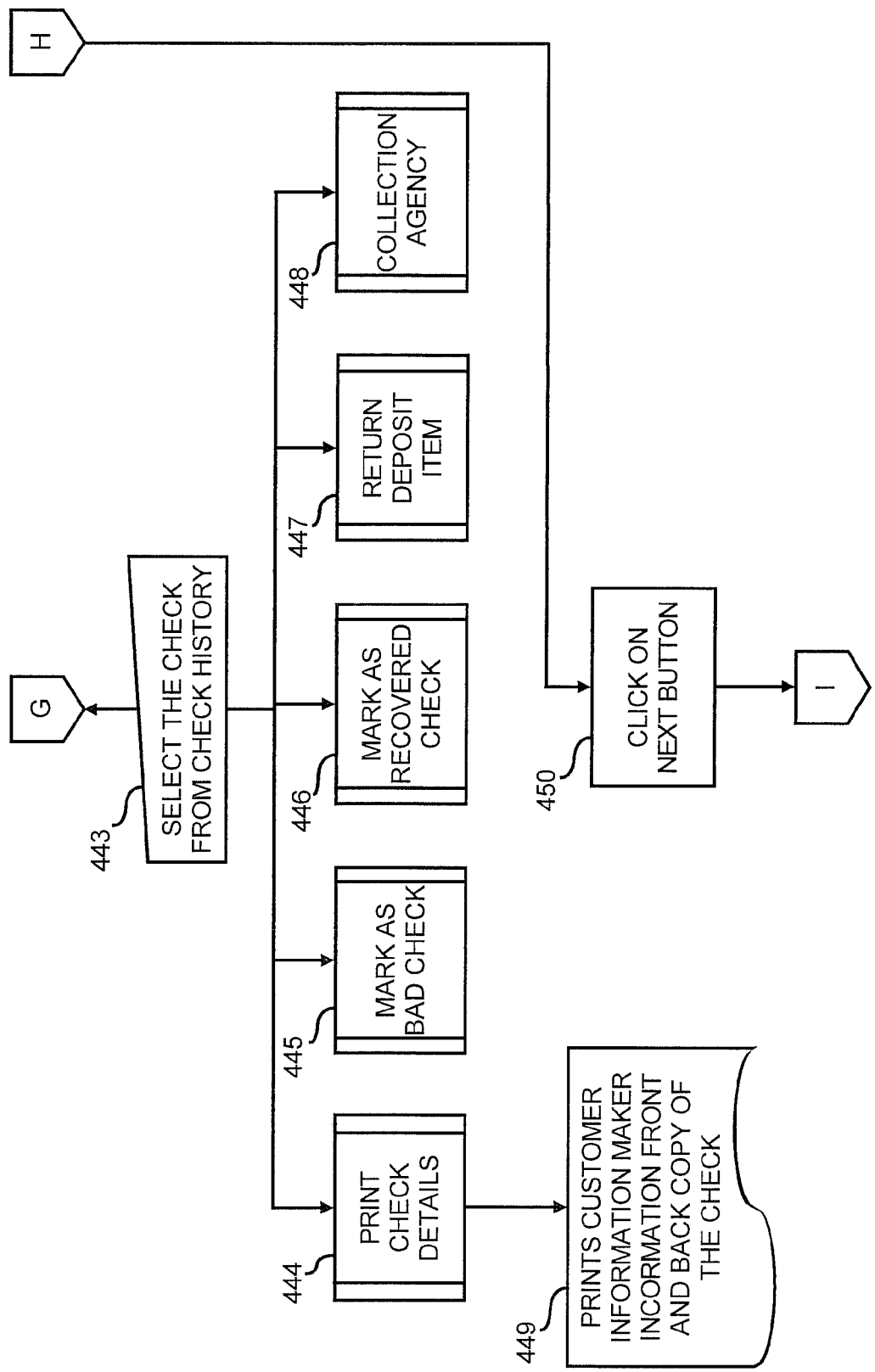

FIGS. 5A-F illustrate a check cashing process, according to an embodiment. A summary of some of the steps in FIGS. 5A-F is provided below. The flow charts also provide detail for the steps in the process. In FIG. 5A, once the customers tag is scanned at 436, a lookup is performed on the customer's account to provide the station with all the information for money services processing at 437-439. Also, alerts are shown as needed to prevent fraud.

At 442, the check cashing history of the customer is displayed, and the customer ID may be scanned and the picture taken at 440 and 441 as needed. If the customer ID is already scanned, then this step may not be repeated. If the picture was already taken, the picture may not be re-taken.

From the displayed check cashing history, a check may be selected at 443 and an action may be performed on the selected check at 444-448, such as printing, marking as bad or recovered, returning a deposit item, or submitting a bad debt to a collection agency. Other information may be printed at 449 and the user may perform another check cashing function at 450.

Figure 5B:
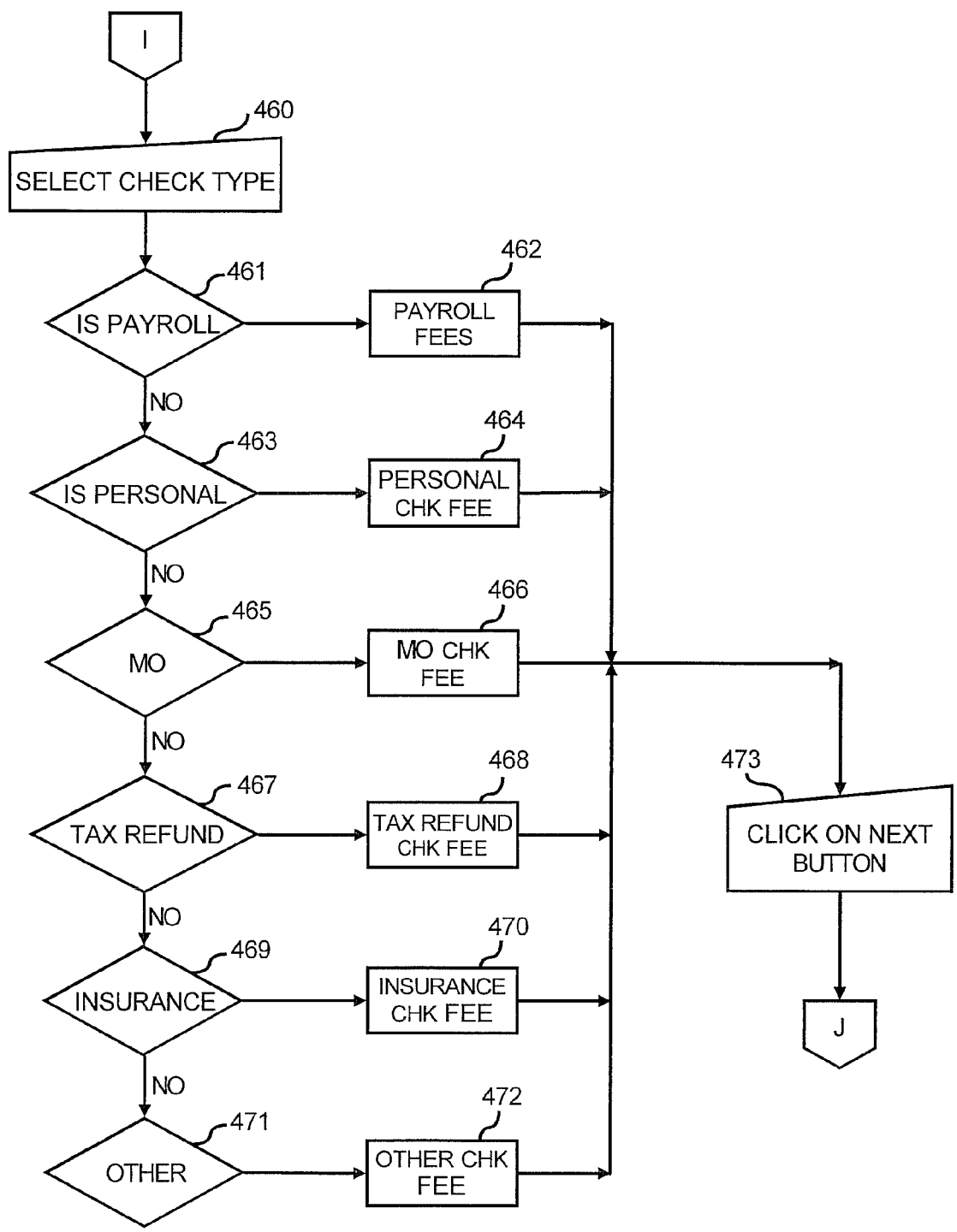

FIG. 5B shows different processing steps for different types of checks. At 461 and 462, payroll fees are paid. At 463 and 464 personal check fees are paid. At 465 and 466 money order fees are paid. At 467 and 468, tax refund fees are paid. At 469 and 470, insurance check fees are paid. At 471 and 472, other fees may be paid. At 473, another action may be performed.

Figure 5C:
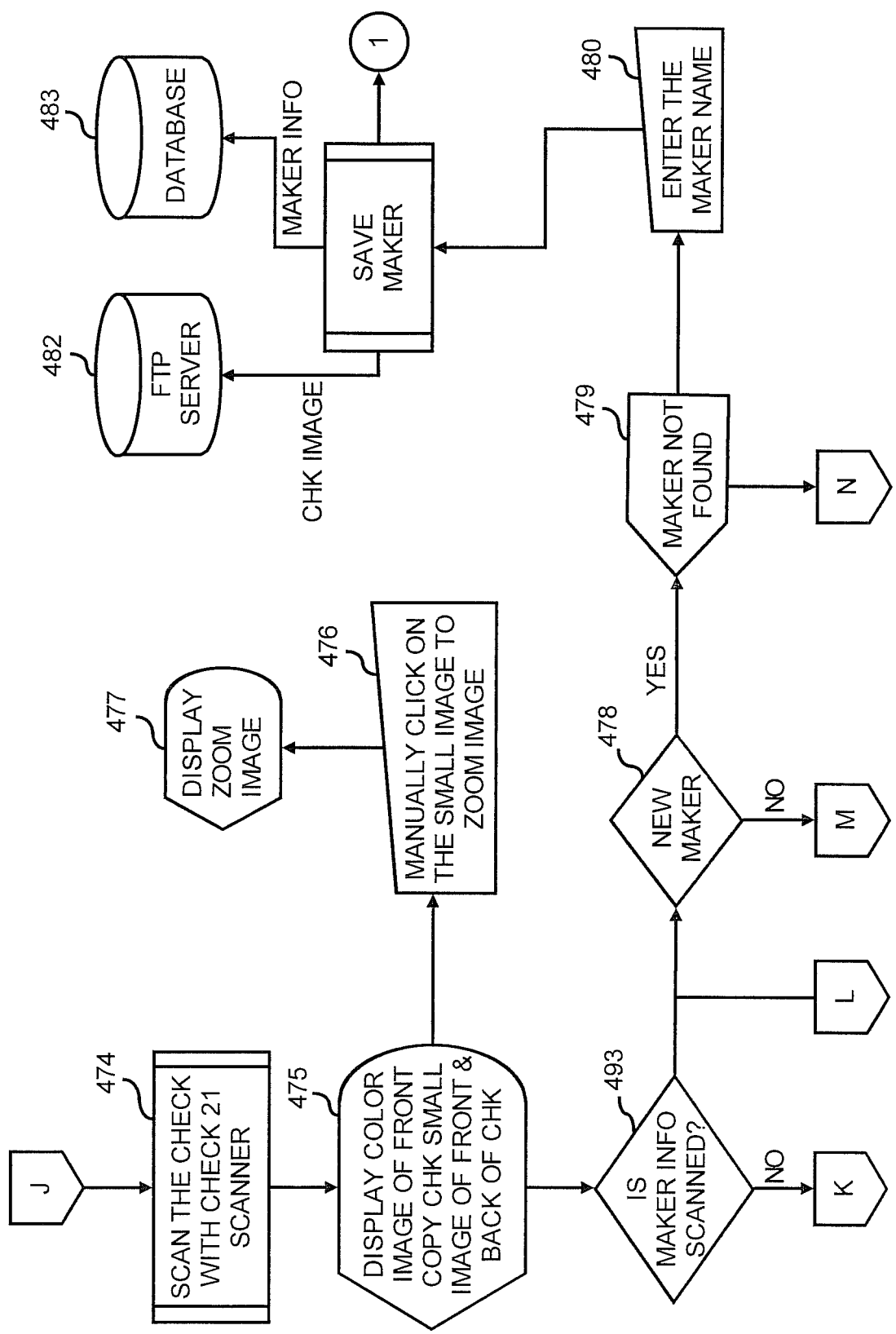
Figure 5C:
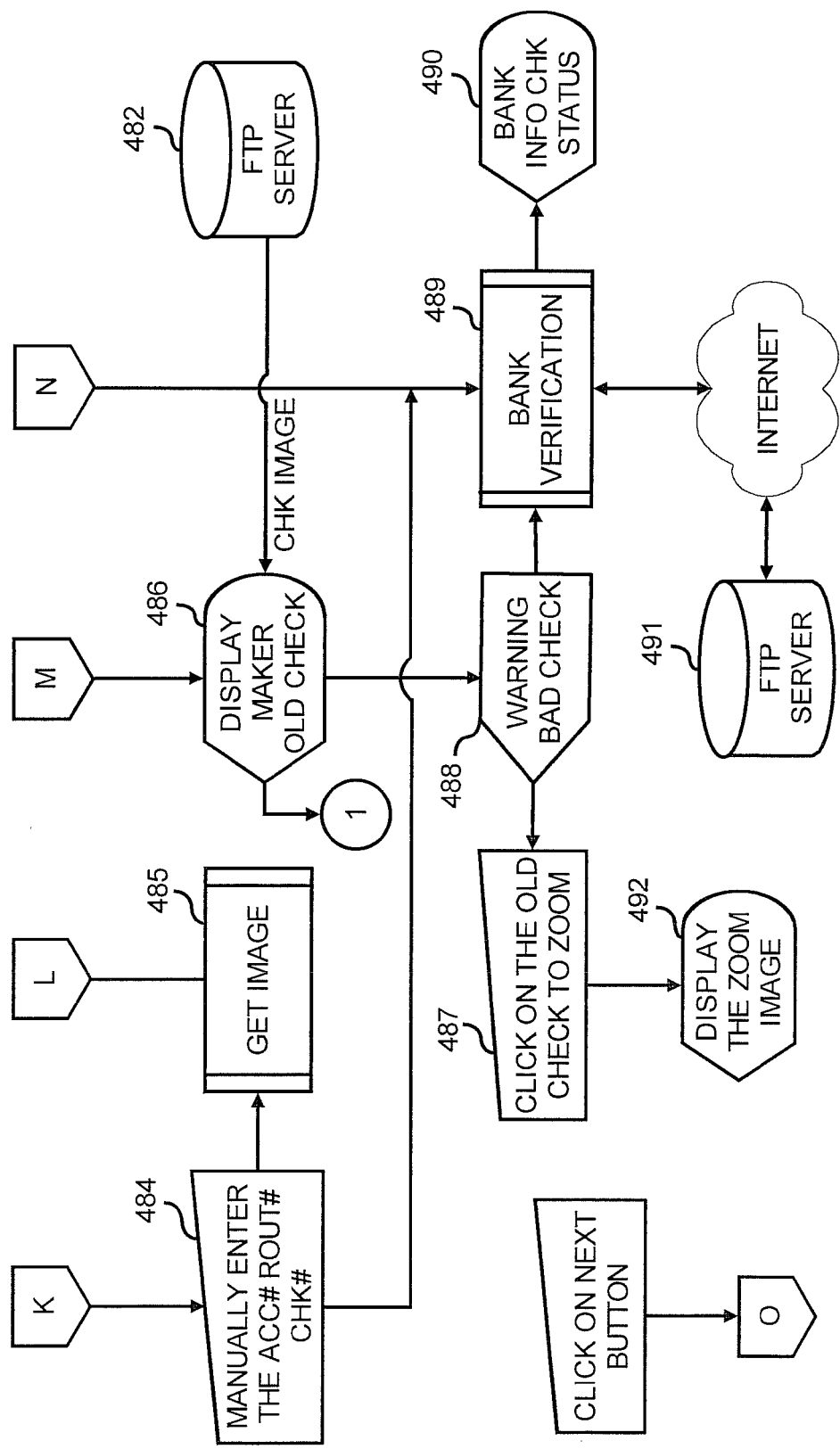

FIG. 5C shows that the check is scanned and displayed at 474 and 475 when presented by the customer for cashing. The zoom image of the check may be displayed at 476 and 477. Also, a lookup is performed for the check maker's information to detect fraudulent checks at 492. If the maker of the check is not in the system, then the maker information is entered and saved in the servers at 482 and 483 at 478-481. If the maker information is in the system, an image of an old check for the maker is retrieved and displayed so the user can compare the checks at 482 and 486. If a warning of a bad check is displayed or the user believes the check may be bad, the old check may be viewed again by zooming at 487 and 492. Also, bank account verification is performed at 489-491. At 484 and 485, check information may be manually entered to retrieve any images of other checks from the maker.

Figure 5D:
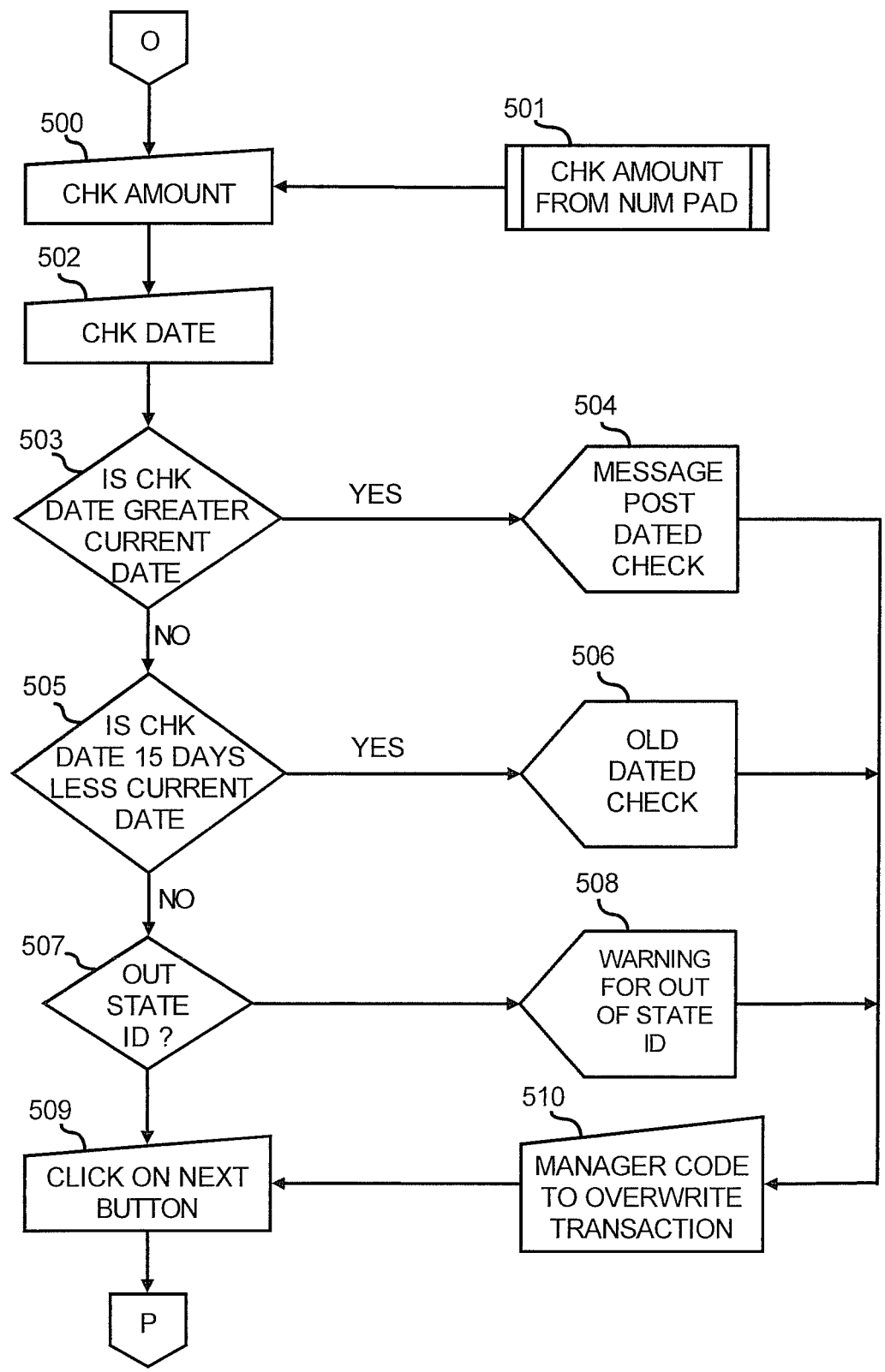

FIG. 5D shows steps for checking the check date. The check amount and date may be entered at 500-502. If the check date is later than the current date a warning is displayed at 503 and 504. If the check date is older than 15 days (or some other predetermined threshold) from the current date, a warning is displayed at 505 and 506. If an out of state ID is presented, a warning is displayed at 507-508. A manager code may be required to be entered for the user or the manager to complete the customer's transaction at 510, and then at 509, another action may be performed.

Figure 5E:
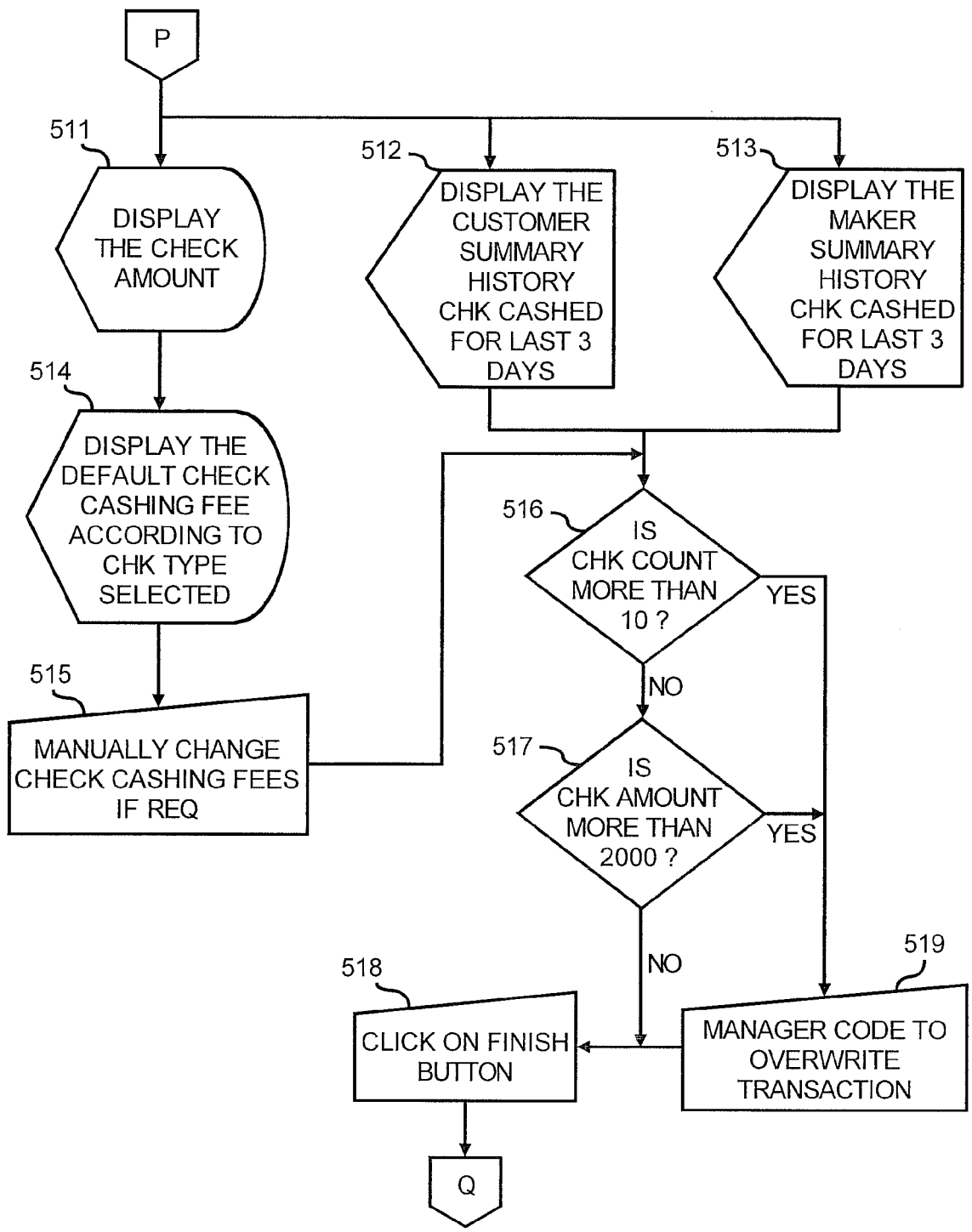

FIG. 5E shows steps which require the station to determine whether the check count is more than 10 or if the check amount is greater than 2000. Different thresholds may be set. However, if a threshold is met, than a manager code may be needed to perform the transaction.

At 511-513, the check amount, customer check history and maker history are displayed. At 514, the check cashing fee is displayed and may be manually changed. At 516, 517, and 519, if a number of checks cashed by the same customer exceeds a threshold or the check amount exceeds a threshold, a manager code may be required to complete the transaction. At 518, the transaction is completed and another action may be performed.

Figure 5F:
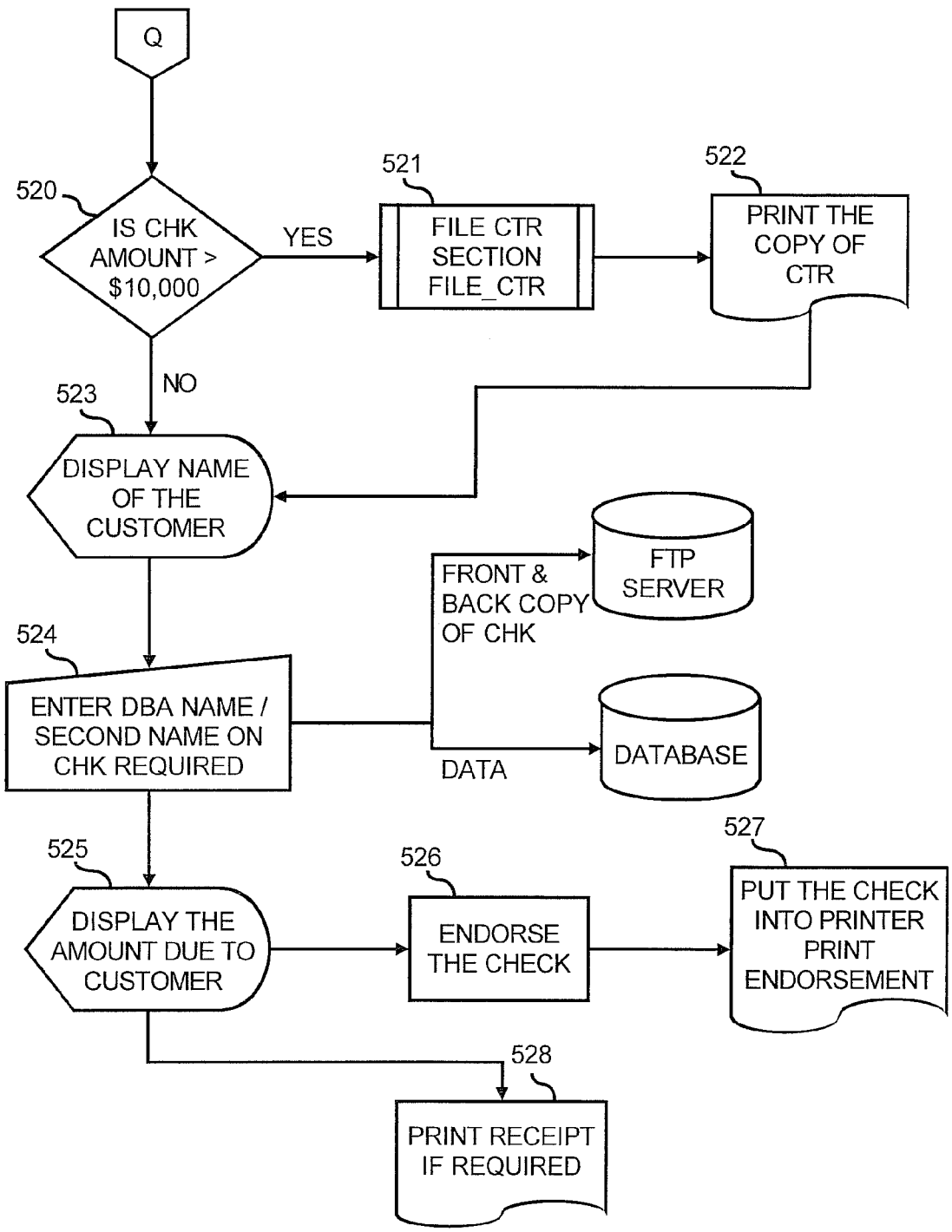

FIG. 5F shows the automatic CTR reporting and report printing if the check amount exceeds $10,000.00, at 520-522. Also, check information is stored in the servers at 523 and 524. The amount due for the check is displayed to the user, and the check is endorsed at 525 and 526. The endorsement may be printed at 527. At 528 a receipt is printed.

Figure 6:
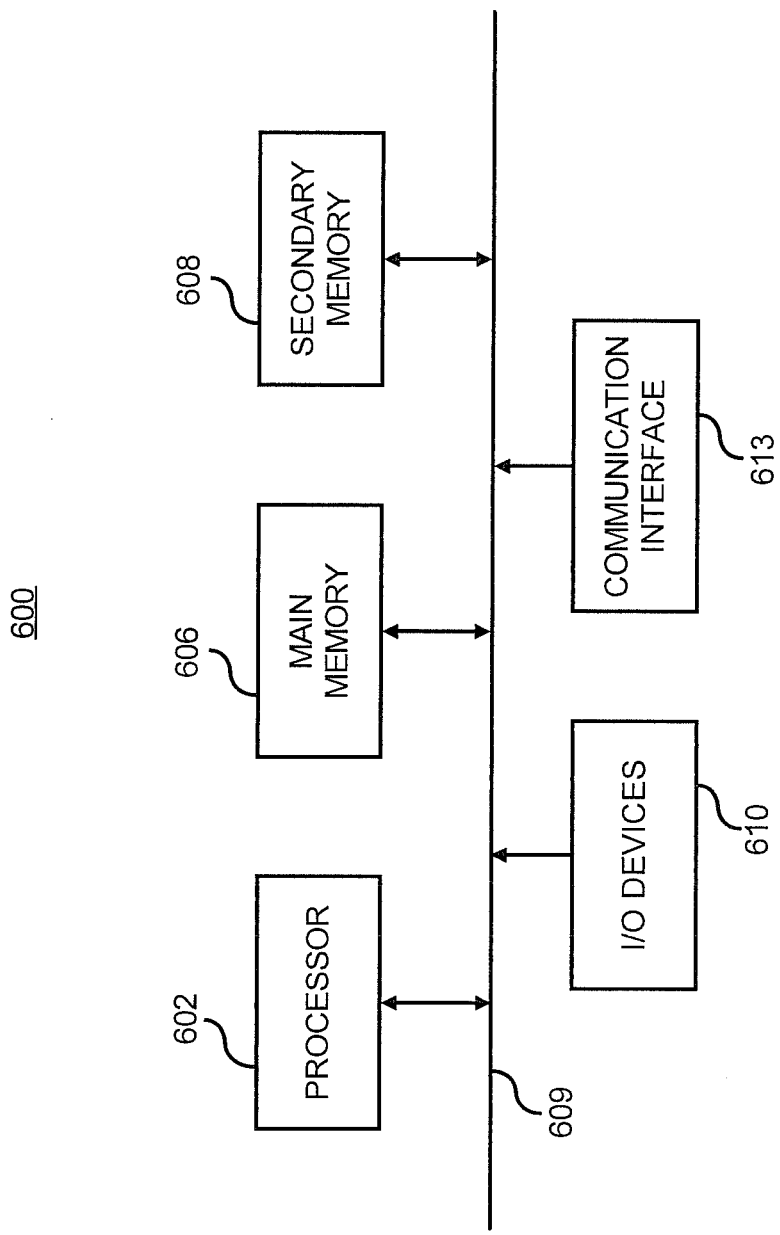
FIG. 6 illustrates a computer system, according to an embodiment.

FIG. 6 illustrates a generic hardware platform that may be used to run the software. Components may be added or removed from the general purpose system 900 to provide the desired functionality.

The system 600 includes a processor 602, providing an execution platform for executing software. Commands and data from the processor 602 are communicated over a communication bus 603. The system 600 also includes a main memory 606, such as a Random Access Memory (RAM), where software may reside during runtime, and a secondary memory 608. The secondary memory 608 may include, for example, a nonvolatile memory where a copy of software is stored. In one example, the secondary memory 608 also includes ROM (read only memory), EPROM (erasable, programmable ROM), EEPROM (electrically erasable, programmable ROM).

The system 600 includes I/O devices 610. The I/O devices may include a display and/or user interfaces comprising one or more I/O devices 610, such as a keyboard, a mouse, a stylus, speaker, and the like. A communication interface 613 is provided for communicating with other components. The communication interface 613 may be a wired or a wireless interface. The communication interface 613 may be a network interface. The components of the system 600 may communicate over a bus 609.

One or more of the steps of the methods described above and other steps described herein and software described herein may be implemented as software embedded or stored on a computer readable medium. The steps may be embodied by a computer program, which may exist in a variety of forms both active and inactive. For example, they may exist as software program(s) comprised of program instructions in source code, object code, executable code or other formats for performing some of the steps when executed. Modules include software, such as programs, subroutines, objects, etc. Any of the above may be stored on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

As described above, a user of the system shown in FIGS. 1 and 2 may be presented with a GUI to perform many of the functions of the system described above. FIG. 7 illustrates an example of a screenshot for the system. Sections A and B show the types of services that may be clicked-on by the user. Section C shows where the information for a check being cashed and/or old checks is displayed. FIG. 8 shows an example of a screen shot for displayed customer profile information. FIG. 9 shows a screenshot for check cashing where a warning may be displayed.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method of check cashing comprising:
receiving a scan of a customer tag, wherein the customer tag includes a unique customer identity of a customer presenting a check to be cashed;
receiving an input of information about the check to be cashed;
verifying a maker of the check to be cashed;
performing, utilizing a computer processor, at least one processing determination based on a date of the check;
performing, utilizing the computer processor, at least one processing determination based on an amount of the check;
retrieving customer information from a database using the unique customer identity;
performing, utilizing the computer processor, at least one processing determination based on the unique customer identity;
displaying an alert in response to the date of the check being later than a current date;
displaying the alert in response to the date of the check being older than a predetermined age threshold;
displaying the alert in response to the amount of the check exceeding a threshold check amount;
displaying the alert in response to the customer attempting to cash the check having cashed at least a predetermined number of checks within a first predetermined time period;
displaying the alert in response to the customer attempting to cash the check having cashed at least a predetermined money amount of checks within a second predetermined time period;
automatically endorsing the check to be cashed responsive to no alerts being generated, wherein the automatic endorsing comprises printing on the check name of customer's company, customer's company account information, information identifying a teller cashing the check or the teller's station number, date and time check was cashed, and customer's name;
determining if the check amount is greater than ten thousand dollars;
in response to the check amount being greater than ten thousand dollars, generating and electronic filing a currency transaction report and a suspicious activity report;
storing an image of the customer in the database; and
storing an image of the signature of the customer in the database, wherein the image of the customer and the signature are retrieved from the database and displayed for a subsequent transaction of the customer to verify the customer's identity.

2. The method of claim 1, wherein the scan of the customer tag is received from a card.

3. The method of claim 1, wherein the tag includes the image of the customer.

4. The method of claim 1, further comprising displaying a check cashing history of the customer.

5. The method of claim 4, further comprising selecting a check from the check cashing history.

6. The method of claim 5, further comprising performing an action based on the selected check.

7. The method of claim 6, wherein the performed action based on the selected check is marking the check as a bad check.

8. The method of claim 1, wherein verifying the maker of the check includes displaying an image of another check by the maker.

9. The method of claim 1, wherein verifying the maker of the check includes performing a bank account verification including analyzing at least one of the checking account number and the bank routing number of the check.

10. The method of claim 1, wherein verifying the maker of the check includes performing a bank account verification including analyzing at least one of the checking account number and the bank routing number of the check.

11. The method of claim 1, wherein performing at least one processing determination based on the date of the check includes determining if the check is dated after the current date.

12. The method of claim 1, wherein performing at least one processing determination based on the date of the check includes determining if the check is dated more than 15 days prior to the current date.

13. The method of claim 1, wherein performing at least one processing determination based on the amount of the check includes determining if the check amount is greater than 10,000 USD.

14. The method of claim 1, wherein performing at least one processing determination based on the unique customer identity includes determining if customer presenting a check to be cashed has cashed more than 10 checks in a period prior to the current date.

15. The method of claim 1, wherein performing at least one processing determination based on the unique customer identity includes determining if customer presenting a check to be cashed has also cashed more than 2000 USD in a period prior to the current date.

16. The method of claim 1, wherein performing at least one processing determination based on the unique customer identity includes, if the number of checks cashed in a period prior to the current date exceeds a preselected threshold, requiring a receiving of a manager code to complete the check cashing transaction.

17. A system performing a method of check cashing, the system comprising:
  a computer interface to
    receive a scan of a customer tag, wherein the customer tag includes a unique customer identity of a customer presenting a check to be cashed, and
    receive an input of information about the check to be cashed; and a computer processor to
    verify a maker of the check to be cashed,
    perform at least one processing determination based on a date of the check,
    perform at least one processing determination based on an amount of the check,
    retrieve customer information from a database using the unique customer identity,
    perform at least one processing determination based on the unique customer identity,
    display an alert in response to the date of the check being later than a current date;
    displaying the alert in response to the date of the check being older than a predetermined age threshold,
    display the alert in response to the amount of the check exceeding a threshold check amount,
    display the alert in response to the customer attempting to cash the check having cashed at least a predetermined number of checks within a first predetermined time period,
    display the alert in response to the customer attempting to cash the check having cashed at least a predetermined money amount of checks within a second predetermined time period;
    automatically generate an endorsement for the check to be cashed responsive to no alerts being generated, wherein the automatic endorsement comprises the check name of customer's company, customer's company account information, information identifying a teller cashing the check or the teller's station number, date and time check was cashed, and customer's name;
    determining if the check amount is greater than ten thousand dollars;
    in response to the check amount being greater than ten thousand dollars, generating and electronic filing a currency transaction report and a suspicious activity report;
    storing an image of the customer in the database; and
    storing an image of the signature of the customer in the database, wherein the image of the customer and the signature are retrieved from the database and displayed for a subsequent transaction of the customer to verify the customer's identity.

18. The system of claim 17, wherein performing at least one processing determination based on the unique customer identity includes, if the number of checks cashed in a period prior to the current date exceeds a preselected threshold, requiring a receiving of a manager code to complete the check cashing transaction.

19. A non-transitory computer readable medium (CRM) storing computer readable instructions which, when executed by a computer system, performing a method of check cashing comprising:
  receiving a scan of a customer tag, wherein the customer tag includes a unique customer identity of a customer presenting a check to be cashed;
  receiving an input of information about the check to be cashed;
  verifying a maker of the check to be cashed;
  performing, utilizing a computer processor, at least one processing determination based on a date of the check;
  performing, utilizing the computer processor, at least one processing determination based on an amount of the check;
  retrieving customer information from a database using the unique customer identity;
  performing, utilizing the computer processor, at least one processing determination based on the unique customer identity;
  displaying an alert in response to the date of the check being later than a current date;
  displaying the alert in response to the date of the check being older than a predetermined age threshold;
  displaying the alert in response to the amount of the check exceeding a threshold check amount;
  displaying the alert in response to the customer attempting to cash the check having cashed at least a predetermined number of checks within a first predetermined time period;
  displaying the alert in response to the customer attempting to cash the check having cashed at least a predetermined money amount of checks within a second predetermined time period;
  automatically endorsing the check to be cashed responsive to no alerts being generated, wherein the automatic endorsing comprises printing on the check name of customer's company, customer's company account information, information identifying a teller cashing the check or the teller's station number, date and time check was cashed, and customer's name;
  determining if the check amount is greater than ten thousand dollars;
  in response to the check amount being greater than ten thousand dollars, generating and electronic filing a currency transaction report and a suspicious activity report;
  storing an image of the customer in the database; and
  storing an image of the signature of the customer in the database, wherein the image of the customer and the signature are retrieved from the database and displayed for a subsequent transaction of the customer to verify the customer's identity.

* * * * *

UNITED STATES PATENT AND TRADEMARK OFFICE
CERTIFICATE OF CORRECTION

PATENT NO. : 8,719,129 B2
APPLICATION NO. : 12/264079
DATED : May 6, 2014
INVENTOR(S) : Mehta et al.

It is certified that error appears in the above-identified patent and that said Letters Patent is hereby corrected as shown below:

In the Claims

In column 10, line 62, claim 20 should read

The CRM of claim 19, wherein performing at least one processing determination based on the unique customer identity includes, if the number of checks cashed in a period prior to the current date exceeds a preselected threshold, requiring a receiving of a manager code to complete the check cashing transaction.

Signed and Sealed this
Twenty-ninth Day of July, 2014

Michelle K. Lee
*Deputy Director of the United States Patent and Trademark Office*